United States Patent [19]
Fields et al.

[11] Patent Number: 6,077,401
[45] Date of Patent: Jun. 20, 2000

[54] PRODUCTION OF FULLERENES USING CONCENTRATED SOLAR FLUX

[75] Inventors: Clark L. Fields, Greeley; John Roland Pitts; David E. King, both of Lakewood; Mary Jane Hale, Golden; Carl E. Bingham, Denver; Allan A. Lewandowski, Evergreen, all of Colo.

[73] Assignee: Midwest Research Institute, Kansas City, Mo.

[21] Appl. No.: 08/290,538

[22] Filed: Aug. 15, 1994

[51] Int. Cl.$^7$ .................................................. C01B 31/02
[52] U.S. Cl. ................................ 204/157.47; 423/445 B; 423/445 R
[58] Field of Search ............................ 423/445 B, 445 R; 204/157.47

[56] References Cited

U.S. PATENT DOCUMENTS

| | | | |
|---|---|---|---|
| 4,000,733 | 1/1977 | Pauly | 126/685 |
| 5,005,958 | 4/1991 | Winston et al. | 126/685 |
| 5,128,115 | 7/1992 | Glatzmaier | 23/295 S |
| 5,300,203 | 4/1994 | Smalley | 423/445 B |
| 5,316,636 | 5/1994 | Bunshah et al. | 423/445 B |
| 5,556,517 | 9/1996 | Smalley | 423/445 B |

OTHER PUBLICATIONS

Smalley, R. "Self–Assembly of Fullerenes", Accounts of Chem. Research, vol. 25, #3, pp. 98–105, Mar. 1992.
Howard, et al., Nature, 352, 139 (1991).
H. Kroto et al., "$C_{60}$: Buckminster Fullerene", Nature 318, 162 (1985).
Kratschmer, et al., Nature, 347 354 (1990).
J. Phys. chem. 97 (34), 8701 (1993), Chibante et al.
Fields, C.L., et al. "Formation of Fullerenes in Highly Concentrated Solar Flux", J. Phys. Chem., vol. 97 (Aug. 26, 1993) pp. 8701–8702.
IBM Technical Disclosure Bulletin, vol. 34, #4B, Sep. 1991, p. 222, Entitled "Method for Mass Producing Large 'Fullerene' Type Carbon Clusters Using Localized Heating Sources".
Diederich, F., et al. Science, vol. 254, pp. 1768–1770 (Dec. 20, 1991), Entitled "Fullerene Isomerism . . . ".
McKinnon, J.T. "Calculated Equilibrium Yields of (60 From Hydrocarbon Pyrolysis . . ", J. Phys. Chem., 1991, vol. 95, pp. 8941–8944.

*Primary Examiner*—Michael Lewis
*Assistant Examiner*—Peter Di Mauro
*Attorney, Agent, or Firm*—Ken Richardson

[57] ABSTRACT

A method of producing soot containing high amounts of fullerenes comprising: providing a primary concentrator capable of impingement of a concentrated beam of sunlight onto a carbon source to cause vaporization of carbon and subsequent formation of fullerenes, or providing a solar furnace having a primary concentrator with a focal point that concentrates a solar beam of sunlight; providing a reflective secondary concentrator having an entrance aperture and an exit aperture at the focal point of the solar furnace; providing a carbon source at the exit aperture of the secondary concentrator; supplying an inert gas over the carbon source to keep the secondary concentrator free from vaporized carbon; and impinging a concentrated beam of sunlight from the secondary concentrator on the carbon source to vaporize the carbon source into a soot containing high amounts of fullerenes.

20 Claims, 6 Drawing Sheets

PRODUCTION OF FULLERENES USING CONCENTRATED SOLAR FLUX

The United States Government has rights in this invention under Contract No. DE-ACO2-83CH10093 between the United States Department of Energy and the National Renewable Energy Laboratory, a Division of the Midwest Research Institute.

BACKGROUND OF THE INVENTION

1. Field of the Invention

The present invention relates generally to a process for delivering highly concentrated solar radiation to a material surface to evaporate the material so that it condenses into caged molecules.

More specifically, the invention is directed to a method for producing fullerenes by: providing a solar furnace having a focal point wherein the solar furnace concentrates sunlight; providing a reflective secondary concentrator having an entrance aperture and an exit aperture at the focal point of the solar furnace; providing graphite at the exit aperture of the secondary concentrator; flowing argon gas over the graphite to keep the secondary concentrator free from vaporized carbon; and impinging the concentrated sunlight from the secondary concentrator onto the graphite to vaporize the graphite into a soot containing high amounts of fullerenes.

2. Description of the Prior Art

A short while ago, carbon was considered to exist in a limited number of forms such as diamond, graphite, glassy carbon, amorphous carbon, and a number of high-temperature species that existed in the vapor phase above 2,000° C. However, in 1984, mass spectrometry experiments revealed that carbon could possibly exist in a number of other forms ranging from $C_{30}$ to $C_{190}$.

Approximately one year subsequent to 1984, the unique stability of molecular allotropic forms such as $C_{60}$ and $C_{70}$ was demonstrated ([H. W. Kroto et al.; Nature 318, 162 (1985)]). These events led to the discovery of a whole new set of carbon-based substances known as fullerenes. Fullerenes are composed of closed polyhedra or tubes produced by carbon atoms linking together to form hexagons and pentagons as shown in FIG. 1.

The configuration of carbon atoms in fullerenes provides properties that have captured the interest of chemists, physicists, materials scientists, and medical researchers, as fullerenes have been shown to crystallize to form interesting solids and to polymerize in several ways to form new polymers. Also, metal atoms can be placed inside the fullerene cage to form encapsulated systems (i.e. $UC_{28}$, $LaC_{82}$, etc.), or outside the cage to form catalysts.

The fullerene cage can be reacted with other substances in a number of ways to form new molecules of interest.

Tubules of fullerenes have caught increasing interest as fibers, nanowires, and encapsulants. Fullerenes may also be doped to form electronic materials or reacted to form superconductors.

All of these applications have been discovered since the first macroscopic amounts of the most common fullerene, $C_{60}$, were isolated in 1990 [Kratschmer, et al., Nature 347, 354 (1990)].

Much of the work on fullerenes was performed using small amounts of material since sythetic approaches to these forms of carbon yielded limited quantities of material. The major drawback to the commercialization of some of the applicatins mentioned is due to the lack of a large-scaled method for producing and isolating fullerenes.

Synthetic production of fullerenes was first provided using vaporization of grapite in an expanding helium atmosphere [H. W. Kroto, et al., Nature 318, 162 (1985)]. In this method, a Q-switched Nd: YAG laser is focused onto a rotating disc of graphite, whereupon carbon is evaporated or ablated into a high density helium flow. Clusters of soot form and are detected using a time-of-flight mass spectrometer. However, this method of production is sufficient to form only a few micrograms of fullerenes per day, which is only enough for certain limited research purposes.

A more useful method of synthesizing fullerene containing soot is the contact-arc method [Kratschmer, et al., Nature 347, 354 (1990)]. In this method, lightly contacting graphite electrodes are heated electrically by an alternating-current arc welder in an atmosphere of helium at a pressure of about 100 to about 200 torr. the graphite heats to evaporation at the contact and produces soot containing fullerenes. The soot condenses upon cool walls of a chamber, and is scraped off after a run that consumes the electrodes. Fullerenes are extracted from the soot by a solvent, such as tolunene or benzene. This method is capable of producing a few tens of milligrams of fullerenes per run. While the apparatus used can be run in parallel so that the process is capable of producing several grams of fullerenes per day, the process is encumbered by scaling problems. For example, as the diameter of the rods are increased and the current supplied to the rods is increased to increase the amount of graphite evaporated per unit time, the yield of fullerenes decreases.

Rods that are ⅛" in diameter are capable of producing maximum yields of about 30%, while rods that are ¼" in diameter are capable of producing yields of around 15%, and rods that are ½" in diameter only have yields that are no more than 7%. The linear decrease in yield with an increase in rod diameter is not understood, but a reasonable conjecture put forth by Chibante, et al. [(J. Phys. Chem. 97(34), 8696 (1993)], is that the intense ultraviolet light in the plasma region of the arc may destroy fullerenes before they can exit that region.

Howard, et al. in Nature 352,139 (1991) discloses a third method of producing fullerenes. This method entails burning hydrocarbon feeds in an oxygen deficient flame or sooty flame. Benzene is used as a hydrocarbon source, with an argon diluted oxygen supply. In this method, it was found that soot yields are 0.2 to 12% of the carbon feed, and this gives a maximum yield of fullerenes of 0.3% of the carbon feed. This synthesis process is too costly to compete with the contact-arc process.

U.S. Pat. No. 4,874,596 discloses a method of changing the structure of a solid material in the form of carbon by converting the carbon to one or more other forms including diamond by the intense heat and shock wave force generated and transmitted through the material by intense radiation. This process does not provide caged molecular forms (fullerenes) nor does it encroach upon the physical concepts required for their production.

The three prior art methods of producing fullerenes, namely, laser ablation of graphite targets, the carbon arc process (also called the contact-arc process) and the process whereby soot produced by an oxygen deficient flame is utilized are encumbered by: the small capability of producing only milligram quantities of fullerenes at most; loss of efficiency as the electrode diameter is increased; and the high expense-low yields of soot from benzene (about 0.5%) that result in $C_{60}$ costs of at least about $100.00/g.

Accordingly, there is a need extant in the art of producing fullerenes to provide a method for producing fullerenes that is greater than the milligram quantities presently available through current technology, by providing higher percentages of soot containing higher percentages of fullerenes, at lower cost.

SUMMARY OF THE INVENTION

Accordingly, one object of the invention is to provide a method for producing fullerenes in quantities greater than the few milligrams of fullerenes produced per day by the laser ablation of graphite technique method.

A further object of the invention is to provide a method for producing fullerenes in greater quantities than the gram quantities of material produced per day per unit, without encountering loss of efficiency in production with increases in the electrode diameters using the carbon-arc process (also called the contact-arc process).

A yet further object of the invention is provide a method for producing fullerenes in which the amount of soot is greater in quantity than that which is produced by the oxygen deficient flame process, so that the amount of soot and the quantity of fullerenes contained therein is produced in greater yield.

A still further object of the invention is to provide a method for producing higher yields of fullerenes having a particular molecular weight in soot.

In general, the process of the invention is accomplished by delivering highly concentrated solar radiation onto a graphite target from a focal point of a solar furnace by: providing a solar furnace having a primary concentrator with a focal point that concentrates a solar beam; providing a reflective secondary concentrator having an entrance aperture and an exit aperture at the focal point of the solar furnace; providing graphite at the exit aperture of the secondary concentrator; flowing argon gas over the graphite to keep the secondary concentrator clean of vaporized carbon; and impinging the concentrated sunlight from the secondary concentrator onto the graphite to vaporize the graphite into fullerenes containing soot.

DETAILED DESCRIPTION OF THE INVENTION

All fullerene production methods require a source of small, gas phase carbon clusters (1 to possibly 10 atoms). Two sources of these clusters exist. One method is the combustion of hydrocarbons such as benzene in an oxygen deficient flame to produce a soot along with other combustion products such as $H_2O$, $CO$, and $CO_2$.

While the percentage of fullerenes in the soot may be relatively high, the yield of fullerenes compared to mass of hydrocarbon consumed is low.

The second general method for production of fullerenes uses an energy source to vaporize elemental carbon at temperatures above 3000° C., whereupon the vaporized carbon then condenses into carbon soot. The number of energy sources utilized to vaporize the carbon include lasers, plasmas, induction heating, and arcs struck between graphite rods.

While the arc method has proven to be the most useful, even this method yields only tenths of grams of fullerenes per hour, and none of the existing methods have been brought to large-scale production.

Fullerenes are spherically or tubularly shaped molecules of carbon consisting of from 28 to more than 240 carbon atoms. They are sometimes called "Buckeyballs", "Buckeytubes", or "Buckminister fullerenes" to describe the cage-like structures of the molecules. The typical "Buckeyball" is the $C_{60}$ molecule, which is a truncated icosohedron typified by the soccer ball, with carbon atoms at the 60 vertices of the pentagons and hexagons that form a nearly spherical surface.

Figure 1:
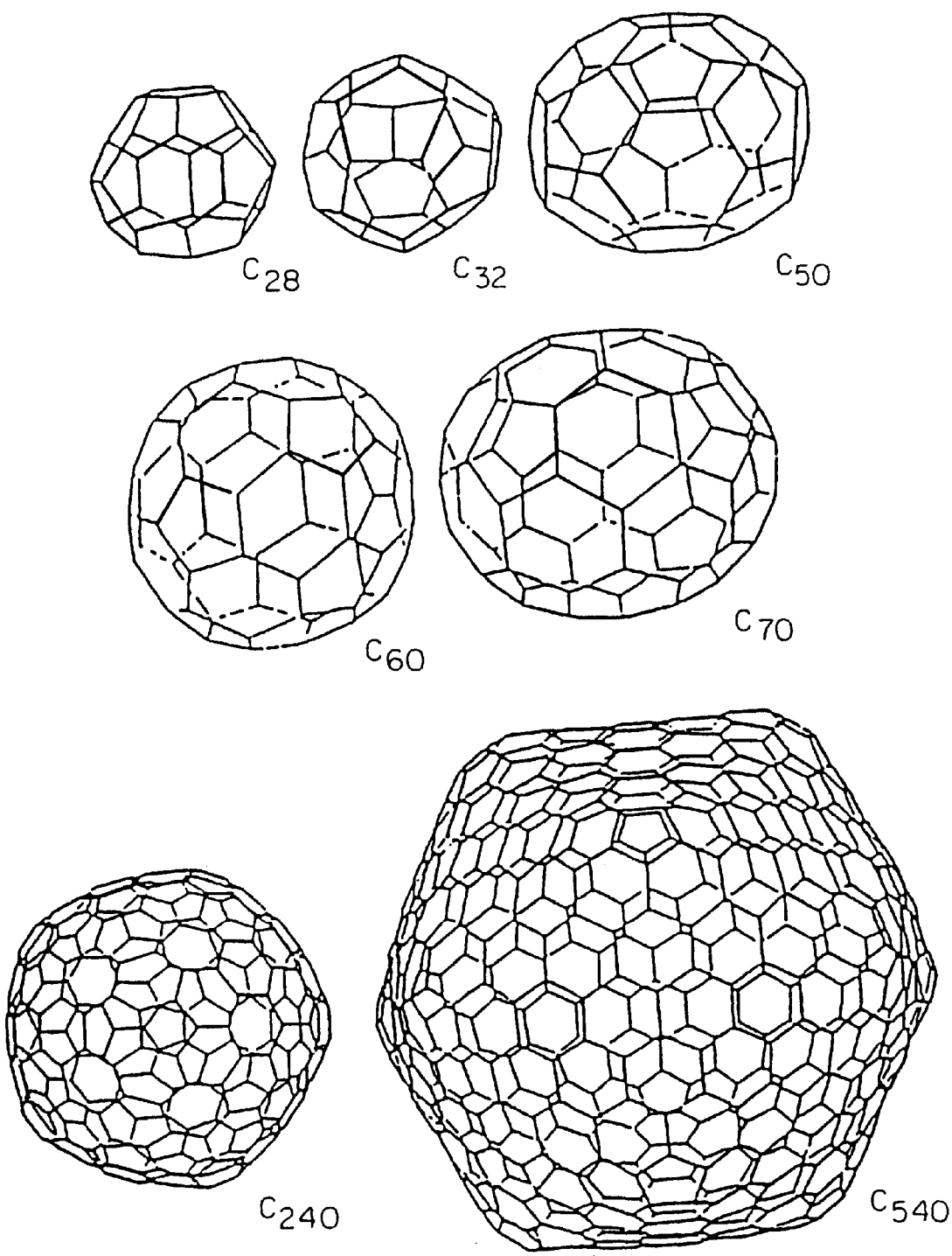
FIG. 1 shows spherically shaped fullerene molecules containing from $C_{28}$ to $C_{540}$ atoms, located at vertices.

Spherical shaped fullerene molecules containing from 28 to 540 carbon atoms are shown in FIG. 1.

Alternately, tubules (sometimes called nanotubes) can be formed where single (or multiple layers) of graphitically bonded ($sp^2$) sheets are rolled to form a tube, which is capped by a hemispherical fullerene molecule.

Tubules can have diameters as small as 1 nm and they may have aspect ratios (l/d) as large as $10^4$ to $10^5$. The calculated tensile strengths of such fibers is enormous.

The system for providing fullerenes of the invention process utilizes highly concentrated sunlight delivered to graphite targets, so that the graphite evaporates and produces fullerenes. The heating process occurs solely from the application of radiant energy from the sun, and no other conversion processes are required. Further, no other energy resources are required, and fullerenes are produced in an energy efficient method without the environmental liabilities associated with fossil or nuclear energy.

Figure 2:
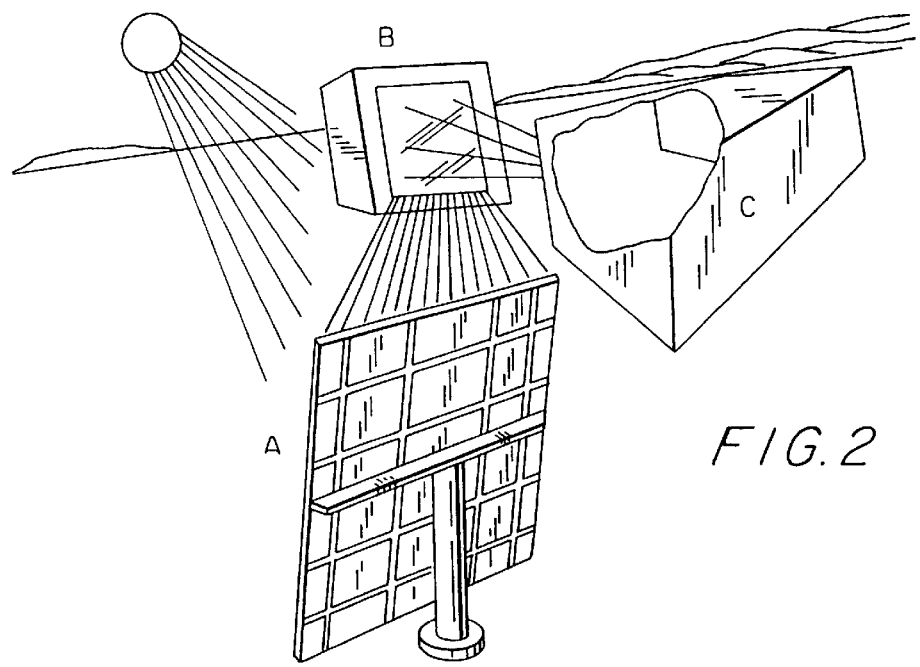
FIG. 2 shows the high-flux solar furnace in which a heliostat (A) tracks the sun and directs the sunlight into a bank of concentrating mirrors (B), after which a concentrator array focuses the sunlight to a focal plane (target plane) inside a bay area (C), that houses the target, control room, and control functions of the furnace.

The primary apparatus used is the high flux solar furnace at South Table Mountain in Golden, Colo. FIG. 2 is a photograph inclusive of a cut-away of the facility showing a heliostat (A) that tracks the sun and directs the sunlight into a bank of concentrating mirrors (B) . The concentrator array focuses the sunlight to a focal plane (target plane) inside of the experimental bay area (C) that houses the target, control room, and all control functions for the furnace. Vacuum chambers, pumps, and a gas supply system are used inside of the bay room to control the processing environment.

The environmentally controlled target chamber consists of a target zone enclosed with a silica or quartz window to admit the sun, a gas supply system, and a vacuum system that allows very clean environments to be maintained. Base pressure in the vacuum system is $10^{-8}$ torr, and it is equipped with a residual gas analyzer (RGA).

Figure 3:
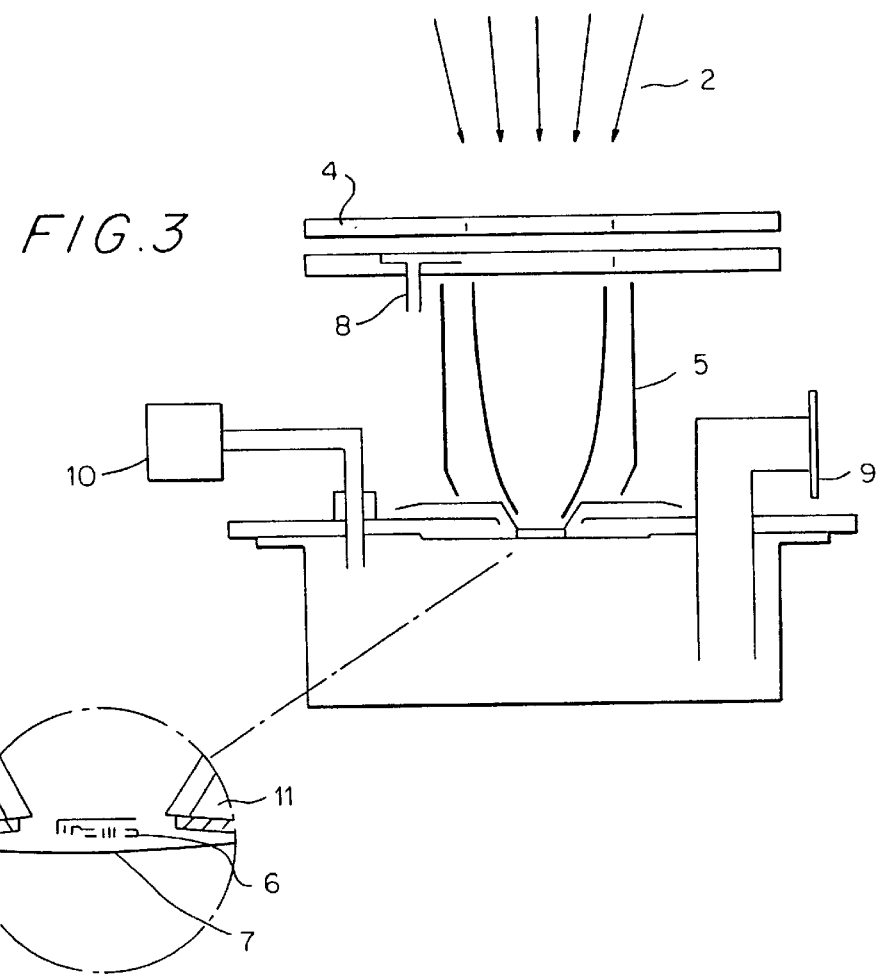
FIG. 3 shows the apparatus in which the graphite pellet is placed in proximity to the secondary concentrator.

In order to provide fullerenes in accordance with the invention, a process chamber was designed to incorporate a secondary concentrator to boost the flux to useful levels for evaporating graphite. A schematic of this chamber is shown in FIG. 3, where solar radiation from the primary concentrator passes through a quartz window 4 and through a secondary concentrator 5 having an entrance aperture and an exit aperture at the focal point of the solar furnace. A graphite target 6, placed on a target support 7 at the exit aperture of the secondary concentrator, is vaporized to fullerene containing soot by impinging concentrated sunlight. The apparatus which produces the soot containing fullerene is equipped with a gas inlet 8 stacked on top of and in close proximity to the secondary concentrator. Argon gas is passed through the inlet port and through the secondary concentrator in a manner so that it impinges on the graphite sample and is then removed by a vacuum pump (not shown) through vacuum port 9. A capacitance manometer 10 is used to measure the gas pressure during the process.

It is important to note that the solar beam is admitted through a high purity fused silica window from the primary concentrator bank. Thereafter, the secondary concentrator concentrates the light down so that the flux is increased by about a factor of 10. The highly concentrated solar beam then impinges upon a graphite target, which may be a rod, button or shaped target or a receptacle containing graphite powder. A tantalum shield 11 deflects radiation from the target and prevents overheating of the stainless steel chamber.

Flux measurements were conducted to ensure that the graphite sample temperature was in the range of vaporization. The results of the flux measurements are shown in FIGS. 4 and 5, where the data in these figures were normalized to a direct-normal irradiance of 950 W/m$^2$, which was representative for the days the tests were conducted.

Figure 4:
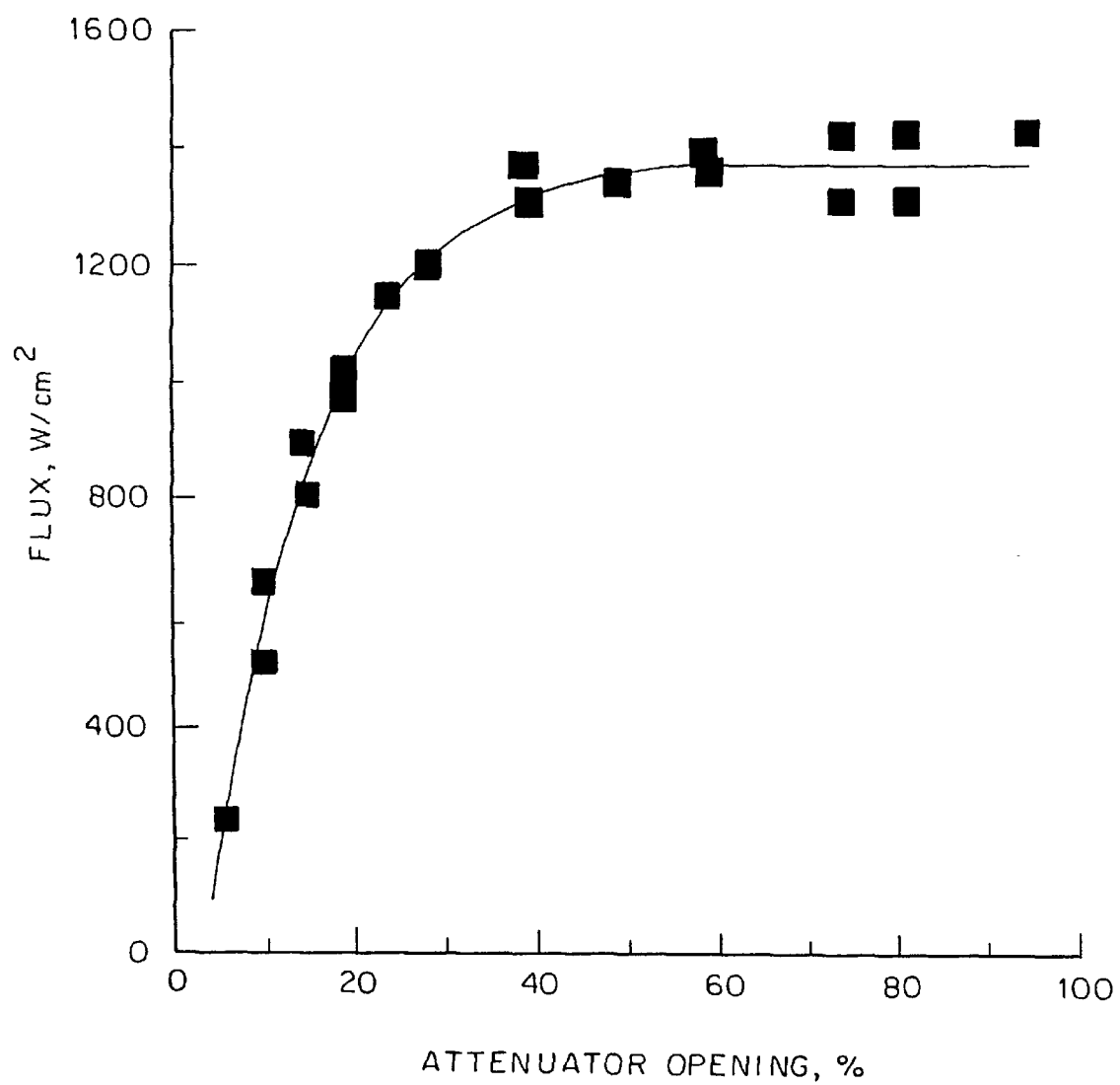
FIG. 4 shows flux measurements, wherein the measured peak flux is plotted as a function of attenuator opening that makes flux in a given concentration available at the exit of the secondary concentrator.

In FIG. 4, the measured peak flux is plotted as a function of the attenuator opening. With the attenuator fully opened, a flux of over 1,300 W/cm$^2$ (corresponding to a 13,000 concentration just under 15,000) was available at the exit of the secondary concentrator. The data in FIG. 4 was measured with all 25 of the primary concentrator facets uncovered. Similarly, all of the facets were uncovered in the production of fullerenes.

Figure 5:
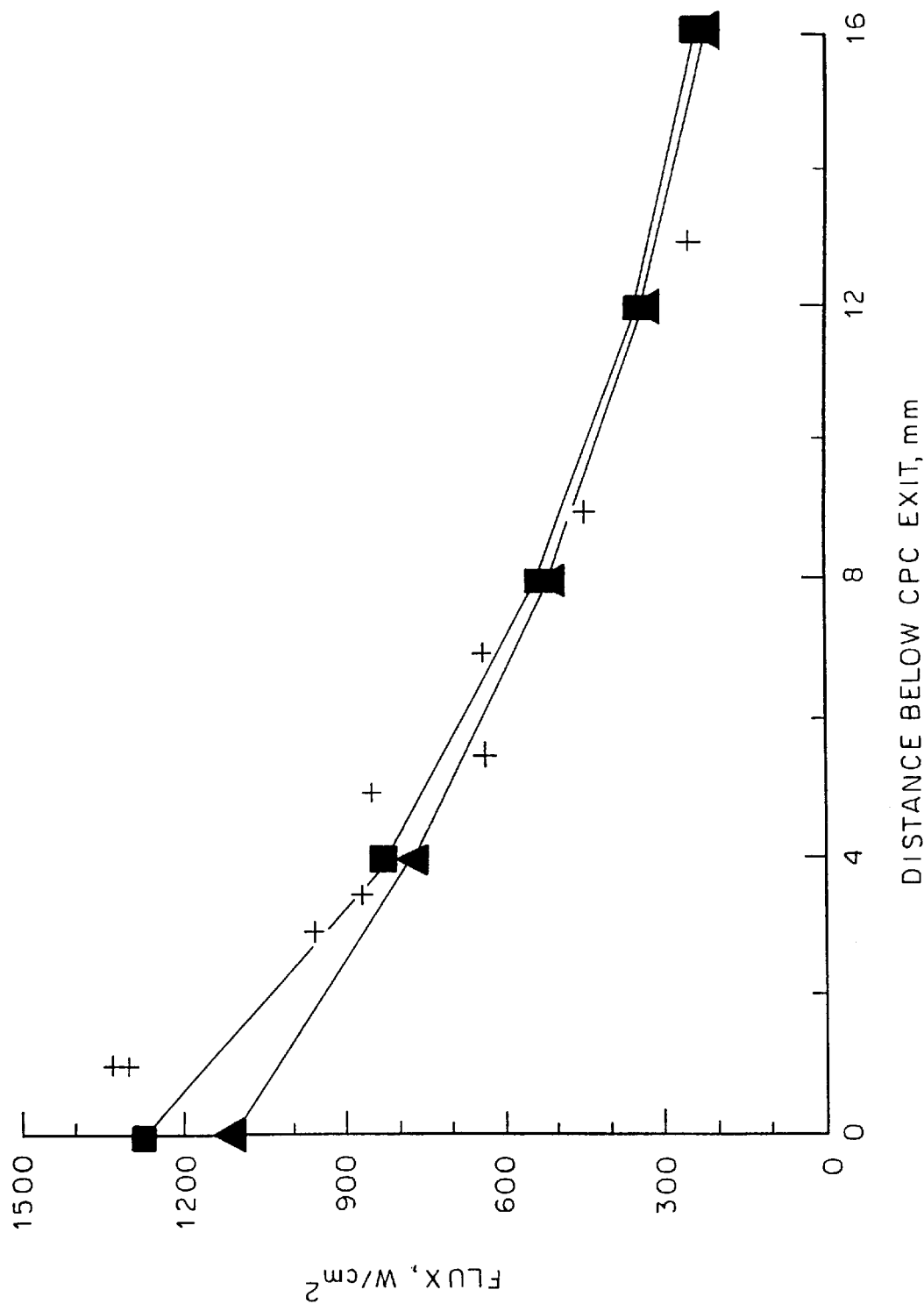
FIG. 5 shows flux measurements plotted as a function of different distances from the secondary concentrator exit with different numbers of concentrator facets uncovered.

The flux is plotted as a function of different distances from the secondary concentrator exit in FIG. 5. These measurements were compared to the flux predicted by a Monte Carlo computer code, SOLFUR, written to explicitly model the various optical components of solar furnaces. By using an additional code specific to reflective secondary concentrators, the set of rays from SOLFUR was traced from the entrance plane of the secondary concentrator to a plane placed at various distances below the exit. The data measured in FIG. 5 was gathered with 19 of the primary concentrator facets uncovered.

The reaction chamber of the apparatus used to produce fullerenes in the invention process is disposed vertically, and is a vacuum sealed system with gas flow ports that permit the fullerene production to be conducted in an oxygen and water free environment. It is sealed on top with a quartz window using a Viton O-ring.

The gas inlet port and the secondary concentrator are disposed beneath the quartz window, and a needle valve outside of the reaction chamber regulates gas flow into the chamber.

The carbon sample sits at the exit aperture of the secondary concentrator, which is in the region of highest solar flux.

The secondary concentrator and the horizontal surface just beneath it have internal cooling channels that are connected to cooling lines.

The bottom section of the reaction chamber is connected to a pumping system fitted with a mechanical pump, a turbo molecular pump, a butterfly valve, and a residual gas analyzer (RGA).

When the concentrated solar flux (approximately 1300 W/cm$^2$) impinges on the top surface of the graphite or carbon sample, the sample vaporizes and carbon vapor condenses in a dry ice trap and on the chamber walls as soot.

Throughout the run, an inert gas (argon) was passed from the inlet port, through the secondary concentrator, over the carbon sample, and then out of the vessel through the vacuum pumping port. In addition to providing an oxygen-free environment, the flowing gas helps to cool the system and keeps the secondary concentrator clean by sweeping the carbon vapor away from its reflective surface.

Graphite was used as the carbon source and the samples were cut from a 0.75-cm thick slab of 99.999% purity graphite. Several 1-cm-diameter cylinders were cut from this slab. Unmodified and modified graphite cylinders were used in the runs. Modified graphite samples were modified by bevelling the top edge to form a conical shape or by cutting a small, hemispherical cavity into the top surface.

For each run, a graphite sample was placed at the exit of the secondary concentrator and the secondary concentrator was at the High Flux Solar Furnace's (HSFS's) focal point. After connecting the chamber to the vacuum system and the cooling lines, the reaction chamber was subjected to a pumping and purging process to clear it of air and water vapor. The chamber was then pumped down to 50 mtorr, and backfilled with argon to 400 torr. This pumping followed by purging was repeated four times, after which the argon inlet valve was closed, and the vessel was pumped down to $5 \times 10^{-5}$ torr to ensure that it was not leaking.

The argon flow was adjusted to the proper level and the butterfly-valve setting was adjusted to bring the chamber to the desired pressure (either 50 torr or 100 torr). Once the chamber pressure was steady, the chamber was illuminated with the attenuated concentrated solar beam for approximately three minutes to "bake out" any impurities in or on the graphite sample. After this baking-out period, the sample was removed from the chamber, weighed, and replaced.

The above procedures were repeated beginning with pumping and purging and finishing with the chamber pressure adjusting. The graphite sample was then exposed to the concentrated beam for a period of from about 30 seconds to about two minutes. After exposure to the flux, the reaction chamber was opened and the soot was removed from the condensing surfaces with a small brush, bottled, and the graphite sample was reweighed.

Figure 6:
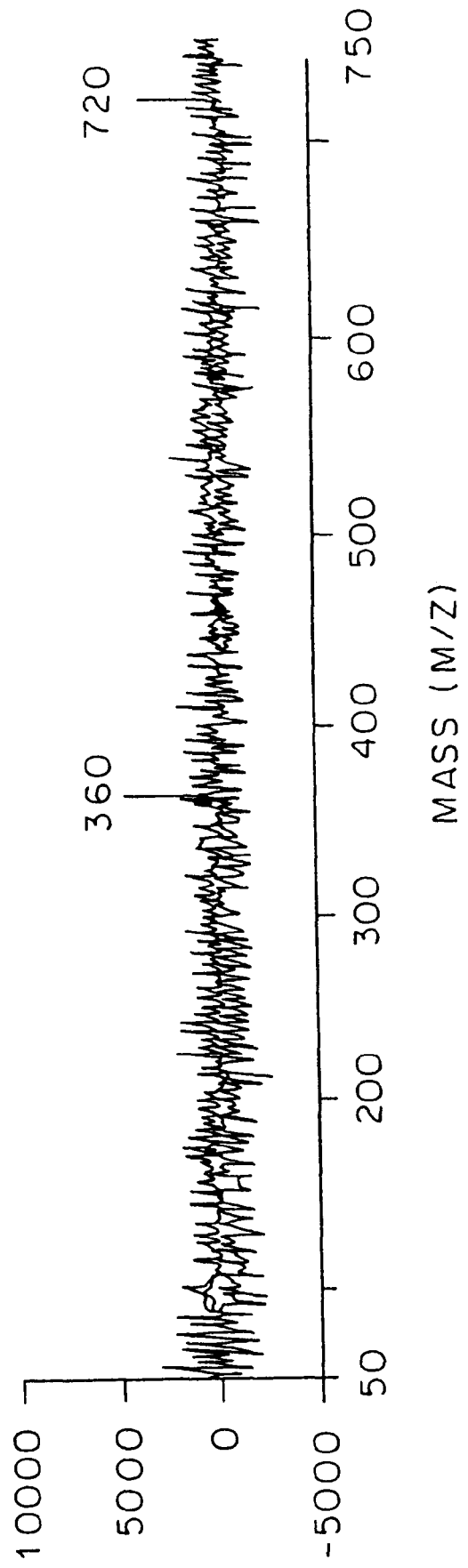
FIG. 6 shows a graph of a mass spectrum of $C_{60}$ in soot produced at the solar furnace, where a 1-mg sample of soot was heated to 600° C. in flowing helium (5 L/min.) at the entrance orifice of a molecular beam mass spectrometer.

As shown in the graph of FIG. 6, a mass spectrum of $C_{60}$ in soot was produced at the solar furnace, where a 1-mg sample of soot was heated to 600° C. in flowing helium (5 liters/minute) at the entrance orifice of a molecular beam mass spectrometer. In this graph, the vertical axis shows relative intensity and the horizontal axis shows the mass. The mass spectrum shows significant peaks at 360 amu and 720 amu for the doubly and singly charged $C_{60}$ molecules.

There were several variables in the operating conditions that had the potential of affecting the optimization of fullerene yield. To determine the influence of the different variables, a Plackett-Burman design of balanced incomplete blocks was used to design a set of runs.

The Plackett-Burman design is a two-level method ("plus" denoting high level and "minus" low level) of experimental design where as few as N experiments can be used to study the effect of as many as N−1 variables (Stowe et al., "Efficient Screenings of Process Variables", Industrial and Engineering Chemistry, 1966, pp. 36–40).

The variables are usually associated with an experimental parameter (i.e., gas pressure), but they can be dummy variables. Dummy variables are not associated with any experimental parameters, but instead add more experiments to the design and thereby refine the statistical calculations of variable effect and standard error.

According to the Plackett-Burman design, the effect of any one variable on the experimental result is determined by the difference between the average value of the results for the positive runs less the average value of the results for the negative runs, as per Equation 1.

$$E_{variable} = \frac{\Sigma R_{(+)}}{\text{No. of (+) runs}} - \frac{\Sigma R_{(-)}}{\text{No. of (−) runs}} \qquad \text{Eqn. (1)}$$

where, $E_{variable}$=effect of variable on results (% fullerene yield), $R_{(+)}$=results from experiments with variable at positive value, $R_{(-)}$=results from experiments with variables at negative value.

The standard error in the effect is calculated with Equation 2.

$$SE_{effect} = \sqrt{\frac{\Sigma (E_{dummy})^2}{n}} \qquad \text{Eqn. (2)}$$

where, $SE_{effect}$=standard error of any effect calculate with Equation 2, $E_{dummy}$=effect of dummy variable(s) on result, n=number of dummy variables.

In the operating runs, the effects of seven different variables were considered. According to the Plackett-Burman method, this required a set of eight runs. The variables and their high-and-low values are given in Table 1. Table 2 has the distribution of the high and low parameters throughout the set of eight runs.

TABLE 1

Variables and parameters used for the Plackett-Burman design

| Variable | High Parameter (+) | Low Parameter (−) |
|---|---|---|
| A = Solar flux | 1300 W/cm$^2$ | 1150 W/cm2 |
| B = Position of sample | at secondary concentrator exit | 2 mm below concentrator exit |
| C = Sample shape | cavity | cone |
| D = Length of exposure | 2 min | 1 min |
| E = Gas flow rate | 4 slm | 2 slm |
| F = Type of gas | He | Ar |
| G = Gas pressure | 100 torr | 50 torr |

TABLE 2

Plackett-Burman matrix for parameters.

| Run | A | B | C | D | E | F | G |
|---|---|---|---|---|---|---|---|
| 1 | + | + | + | − | + | − | − |
| 2 | + | + | − | + | − | − | + |
| 3 | + | − | + | − | − | + | + |
| 4 | − | + | − | − | + | + | + |
| 5 | + | − | − | + | + | + | − |
| 6 | − | − | + | + | + | − | + |
| 7 | − | + | + | + | − | + | − |
| 8 | − | − | − | − | − | − | − |

A series of preliminary runs were made to determine the high-low limits given in Table 1. For example, in one set of runs, it was observed that very little soot was produced for exposure times less than one minute. As the exposure time was lengthened beyond one minute, it was observed that the temperature of the apparatus became dangerously high after approximately two minutes. Therefore, the type of gas was kept constant throughout the set of eight runs and the variance "F" became a dummy variable. It appeared that the superior heat transfer characteristics of helium, as compared to argon, prevented the carbon sample from reaching a high enough temperature for vaporization.

Again, during the preliminary runs, mass spectrometry was used to confirm the existence of $C_{60}$ in the collected soot, and FIG. 6 shows the mass spectrum of a 1 mg soot sample produced during preliminary runs.

The set of eight runs were performed under the conditions prescribed in Table 2.

Table 3 gives the mass of soot produced during each of the runs and the percentage of $C_{60}$ in each soot sample.

TABLE 3

Masses of soot produced during two level experiments and corresponding fullerene yield.

| Run | Soot Mass (mg) | % Yield of Fullerenes |
|---|---|---|
| 1 | 7.0 | 3.2 |
| 2 | 7.6 | 12.8 |
| 1 | 7.0 | 3.2 |
| 3 | 0 | NA |
| 4 | 4.7 | 7.3 |
| 5 | 0 | NA |
| 6 | 0 | NA |
| 7 | 12.6 | 13.9 |
| 8 | 0 | NA |

In Table 3, it is shown that only half of the runs resulted in appreciable soot production. Examination of the data reveals that all of the runs with the sample at the concentrator exit resulted in a measurable amount of soot, but no soot was produced in the runs where the sample was about 2 mm or more below the concentrator exit. Therefore, the graphite sample should be 2 mm or less below the secondary concentrator exit. This is an indication that the negative value for the sample positioning was too extreme.

Of the soot-producing runs, run 7 showed the most promising results, as this run resulted in the largest amount of soot and the highest yield. Although the difference in the percent yield between runs 7 and 2 appears to be within the margin of experimental error (13.9% vs. 12.8%), the difference in the amount of fullerenes produced is significant. Run 7 resulted in approximately 1.8 mg of fullerenes compared to just under 1 mg in run 2. Run 2 and run 7 were both performed with a high exposure length and a low gas flow rate, but run 7 was performed with a low flux parameter, a cavity-shaped sample, and a low chamber pressure.

During these runs, it was apparent that the cavity-shaped samples often showed much greater signs of vaporization activity than the conical-shaped samples. Sample shape is therefore the likely parameter responsible for the large amounts of soot (and hence greater fullerene production) in run 7.

Figure 7:
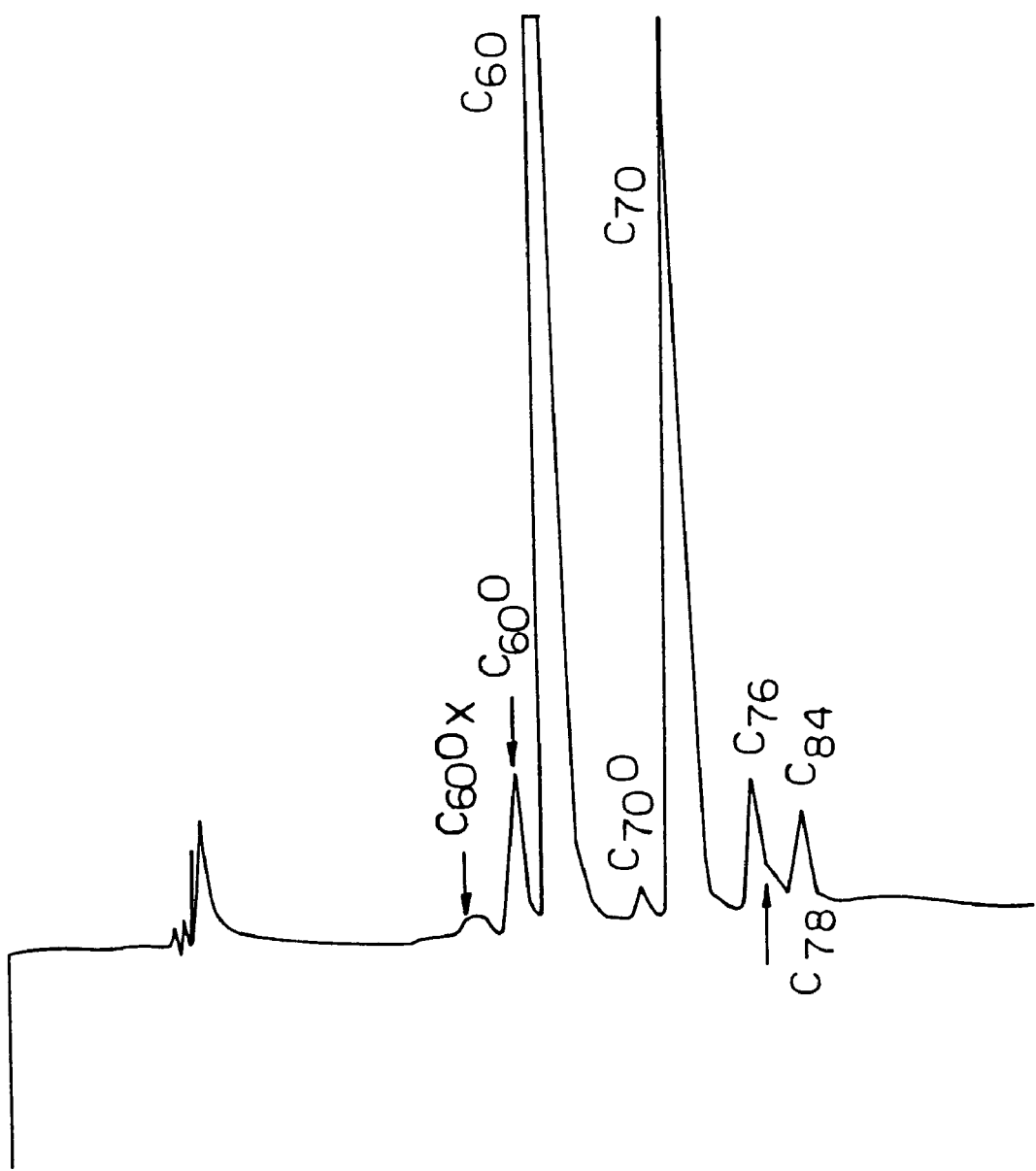
FIG. 7 is a graph showing High Pressure Liquid Chromatography (HPLC) of the toluene soluble extract from soot produced in the solar furnace using the process of the invention.

FIG. 7 shows the retention-time plot from the HPLC analysis of soot run 7.

The effects of the different experimental variables and the associated standard error were calculated using Equations 1 and 2. These statistical results are given in Table 4.

TABLE 4

Relative effects of experimental variables and the standard error on percent fullerene yields.

| Variables | Effect |
| --- | --- |
| Position of sample (B) | 9.3 |
| Length of exposure (D) | 4.05 |
| Gas flow rate (E) | 4.05 |
| Solar flux (A) | 1.3 |
| Dummy (F) | 1.3 |
| Sample shape (C) | 0.75 |
| Chamber pressure (G) | 0.75 |
| Standard Error | 1.3 |

The relatively large standard error in the effect calculations eliminates the significance of the effects calculated for three of the variables: the solar flux (A); the shape of the sample (C) ; and the chamber pressure (G). However, the calculated effects of the remaining three variables are outside of the standard error range.

It is apparent that the position of the sample relative to the secondary concentrator exit had the most significant effect.

The effects of the length of exposure and the gas flow rate calculated to be the same. The fact that no soot was ever produced when the carbon sample was in its low position increased the likelihood for two effects to calculate the same value. The fact that the four runs with low sample position resulted in no soot production lessened the impacts of these runs. The effects of the length of exposure and the gas flow rate were probably not equally significant to the fullerene yield.

It was noted that the effect of the rate of gas flow was actually a negative value; in other words, a low gas flow rate was more conductive to fullerene production.

It appears that the high gas flow cooled the graphite sample, and thereby inhibited vaporization.

Although the low sample position was too extreme to realize the full benefit of the Plackett-Burman design, the effect analysis was still beneficial. The calculated effects revealed that the carbon sample should be positioned at the concentrator exit, and that the lower gas flow rate and the longer exposure times were both conducive to high yields of fullerenes.

Percent yields for the soot samples were determined by toluene extractions from run 7 and matching their high-pressure liquid chromatography (HPLC) retention times with toluene extracts from commercially available soot samples. The yield analysis was performed on a Hewlett Packard Model 1050 HPLC Instrument using a reverse phase column (HP 5μ silica, 300 Å pore size) with toluene/methanol (45:55 at 2 mL/min) as the eluant, and the results are shown in FIG. 7.

While the preferred method of producing soot containing high amounts of fullerenes will utilize a solar furnace having a primary concentrator, followed by the use of a secondary concentrator having an entrance aperture and an exit aperture at the focal point of the solar furnace so as to affect impingement of a concentrated beam of sunlight from the secondary concentrator onto the carbon source to vaporize the carbon source into soot containing high amounts of fullerenes, it is to be understood that the use of a primary concentrator alone will suffice to provide producing soot containing high amounts of fullerenes if the concentrated beam of sunlight is sufficient to cause evaporation of carbon and subsequent formation of fullerenes. In the context of the invention, it has been found that, when a primary concentrator is focused to provide a concentrated solar beam having a flux of between about 250 $W/cm^2$ to about 2,000 $W/cm^2$, the carbon source will vaporize into a soot containing high amounts of fullerenes.

As a result of the invention process, larger amounts of fullerenes can be economically prepared from soot obtained using concentrated solar flux as a supply of source material. The present invention therefore provides a highly economical and useful process for producing fullerenes.

While fullerenes of clusters of carbon atoms ranging from $C_{28}$–$C_{540}$ range were produced, only small amounts of fullerenes having carbon atoms greater than the $C_{60}$ and $C_{70}$ (the most common forms of fullerenes) were produced.

In selecting the carbon source material for production of fullerenes in accordance with the invention process, diamond, graphite, graphite powder, glassy carbon, amorphous carbon, hydrocarbon feed and benzene will suffice; however, graphite is preferred. Graphite having a hemispherical cavity in its top surface is most preferred, as it provides greater amounts of soot containing higher amounts of fullerenes.

Any of the inert gases will suffice in the context of the invention for purposes of keeping the secondary concentrator free from vaporized carbon; however, argon is preferred as it has less of a tendency to prevent vaporization of the soot produced in the solar furnace.

The foregoing description is illustrative only of the principals of the invention. Further, since numerous modifications and changes will readily occur to those skilled in the art, it is not desired to limit the invention to the exact construction and operation shown and described, and accordingly, all suitable modifications and equivalence may be resorted to within the scope of the invention as defined by the claims which follow.

The embodiments of the invention in which an exclusive property or privilege is claimed are defined as follows.

What is claimed is:

1. A method of producing soot containing fullerenes solely from the application of radiant energy from the sun to a carbon source material comprising:

providing a solar furnace having a primary concentrator with a focal point that concentrates a solar beam of sunlight;

providing a reflective secondary concentrator having an entrance aperture and an exit aperture at the focal point of the solar furnace;

providing a carbon source material less than about 2 mm below the exit aperture of the secondary concentrator;

supplying an inert gas over the carbon source material to keep the secondary concentrator free from vaporized carbon; and impinging a concentrated beam of sunlight from the secondary concentrator onto the carbon source material less than about 2 mm below said exit aperture to vaporize the carbon source material into a soot containing fullerenes.

2. The method of claim 1, wherein the concentrated solar flux is between about 250 W/cm$^2$ to about 2,000 W/cm$^2$.

3. The method of claim 1, wherein the fullerenes in the soot are selected from the group consisting of clusters of carbon atoms in the $C_{28}$–$C_{540}$ range.

4. The method of claim 3, wherein the fullerenes in the soot are selected from a group consisting of clusters of carbon atoms in the $C_{60}$–$C_{70}$ range.

5. The method of claim 3, wherein the solar furnace is vacuum-sealed and has a top section which includes a quartz window.

6. The process of claim 5, wherein the carbon source is selected from the group consisting of: diamond, graphite, amorphous carbon, and hydrocarbon feed.

7. The process of claim 6, wherein the carbon source is graphite.

8. The process of claim 7, wherein the inert gas is selected from the group consisting of helium and argon.

9. The process of claim 8, wherein the inert gas is argon.

10. The process of claim 9, wherein the concentrated solar flux from the primary concentrator has a 12 cm diameter and a peak flux of about 250 W/cm$^2$.

11. The process of claim 10, wherein the secondary concentrator has a concentrated solar flux range of between about 1300 W/cm$^2$ and about 2000 W/cm$^2$.

12. The process of claim 11, wherein the graphite is in the form of a cylinder.

13. The process of claim 12, wherein the graphite is in a conically shaped form.

14. The process of claim 11, wherein the graphite has a hemispherical cavity in a top surface thereof.

15. The process of claim 11, wherein the graphite is exposed to the concentrated beam from the secondary concentrator for a period of from about 30 seconds to about 2 minutes.

16. The process of claim 15, wherein the fullerene is a $C_{60}$ fullerene.

17. The process of claim 15, wherein the fullerene is a $C_{70}$ fullerene.

18. The process of claim 15, wherein the fullerene is a $C_{76}$ fullerene.

19. The process of claim 15, wherein the fullerene is a $C_{78}$ fullerene.

20. The process of claim 15, wherein the fullerene is a $C_{84}$ fullerene.

* * * * *